Oct. 22, 1940.   J. P. CASTELLANO   2,219,265
DIRECTION AND SPEED RATIO CHANGING DEVICE FOR MOTOR VEHICLES
Filed Nov. 18, 1936   5 Sheets-Sheet 1
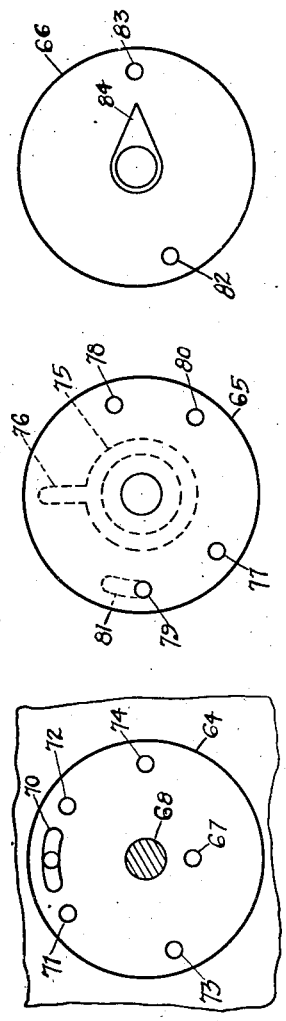
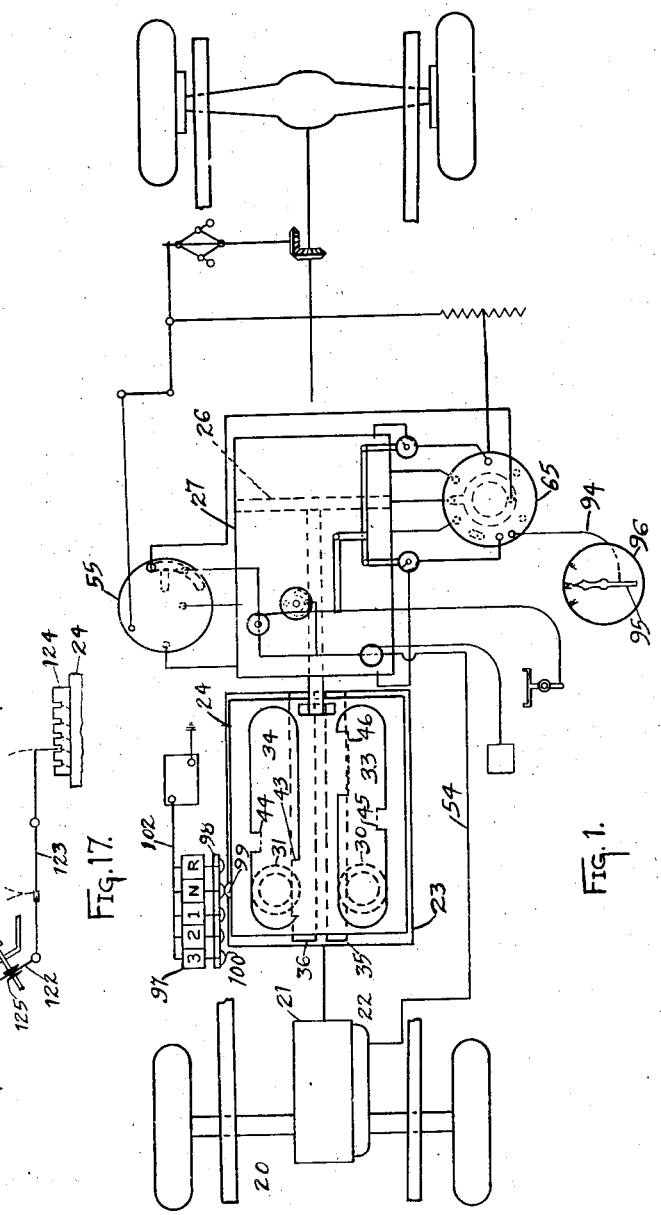
INVENTOR
Joseph P. Castellano Oct. 22, 1940.   J. P. CASTELLANO   2,219,265
DIRECTION AND SPEED RATIO CHANGING DEVICE FOR MOTOR VEHICLES
Filed Nov. 18, 1936   5 Sheets-Sheet 2
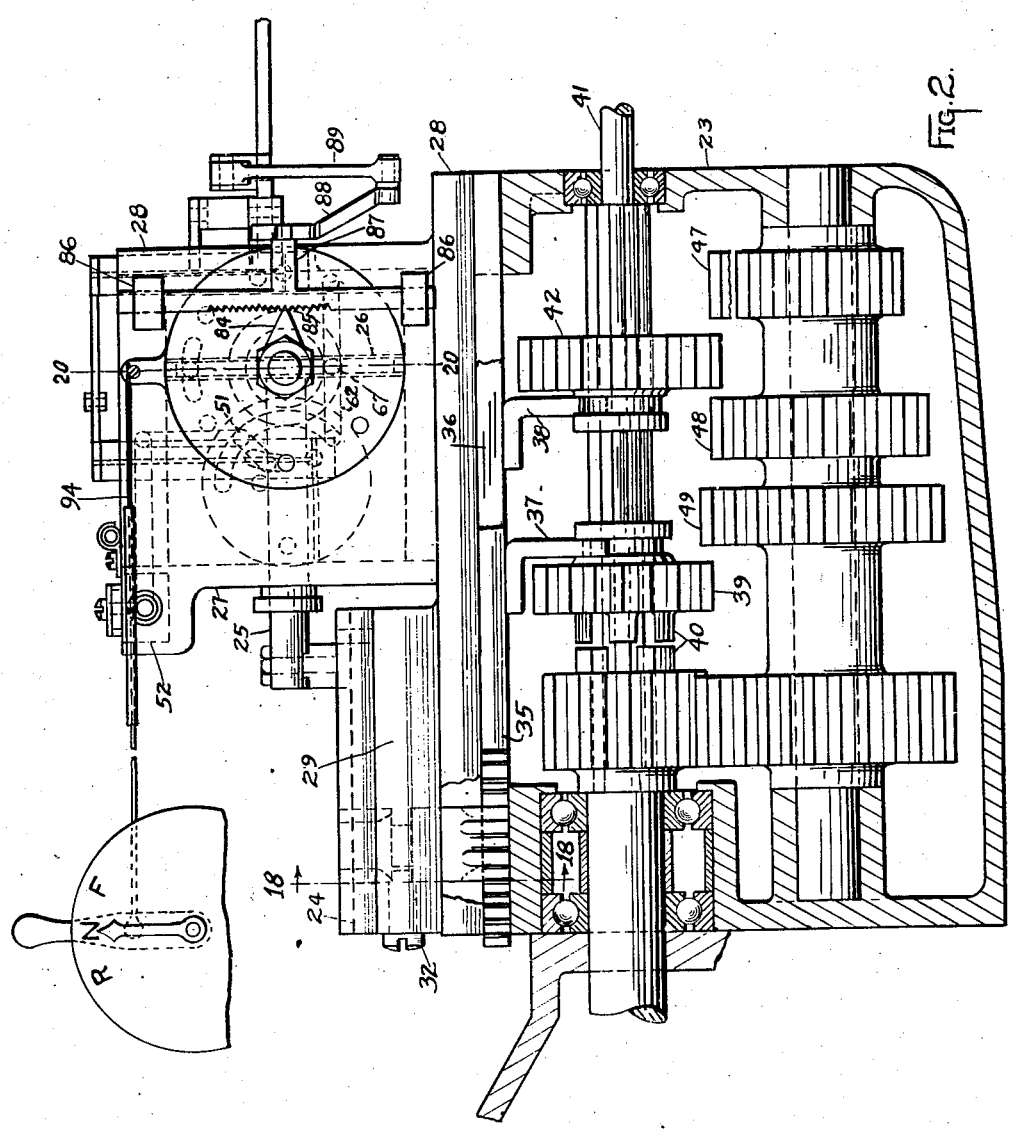
INVENTOR
Joseph P. Castellano

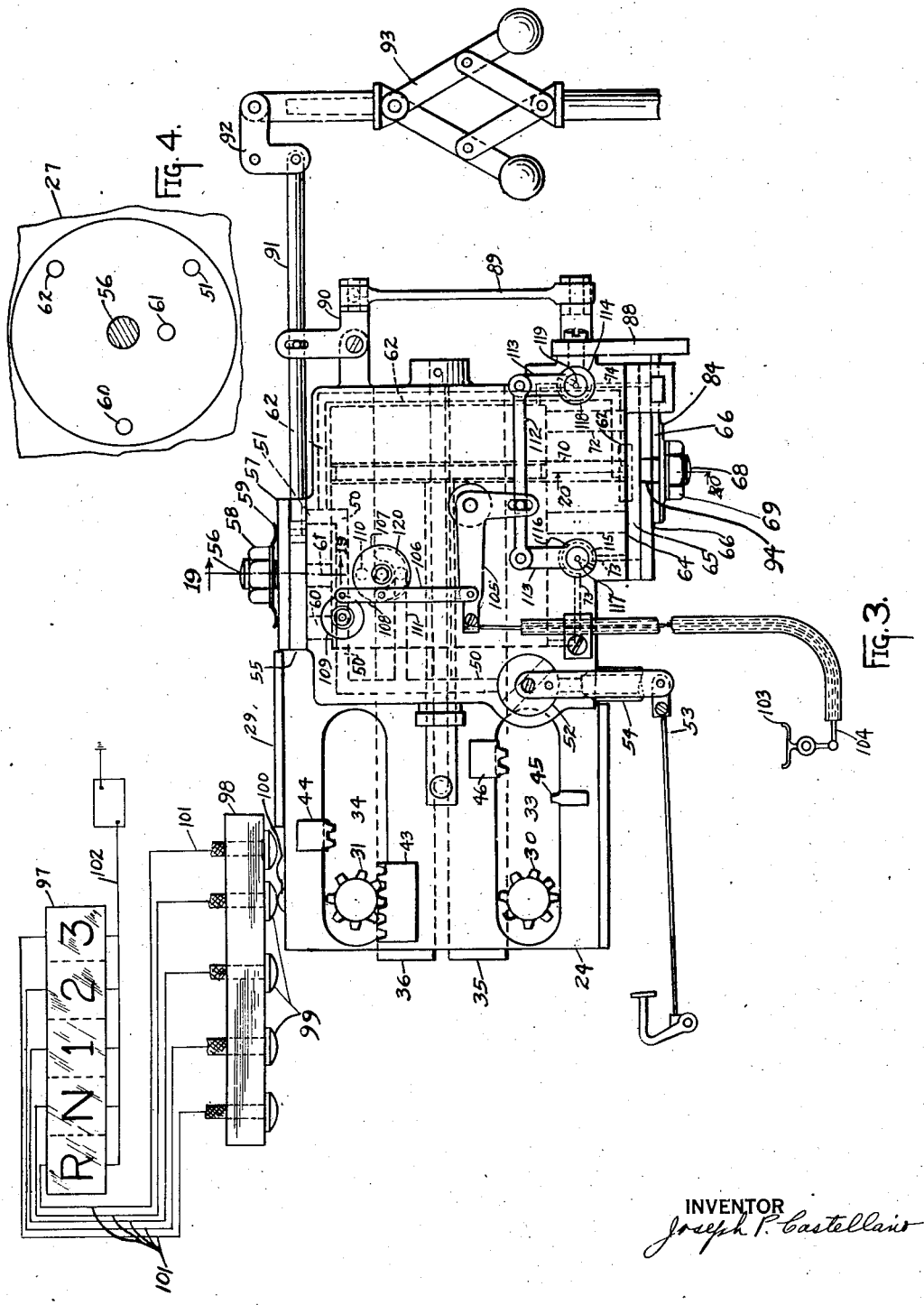

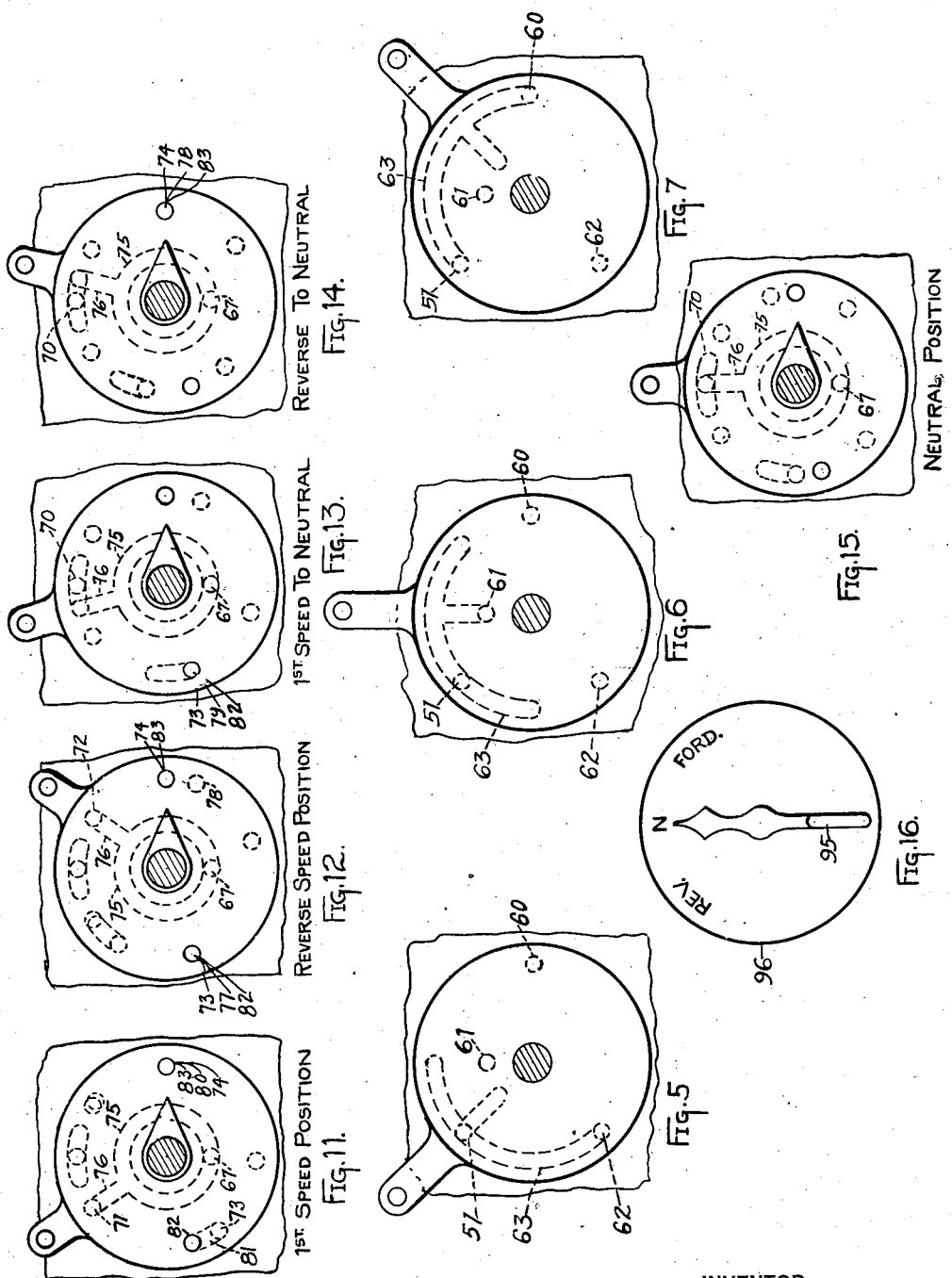

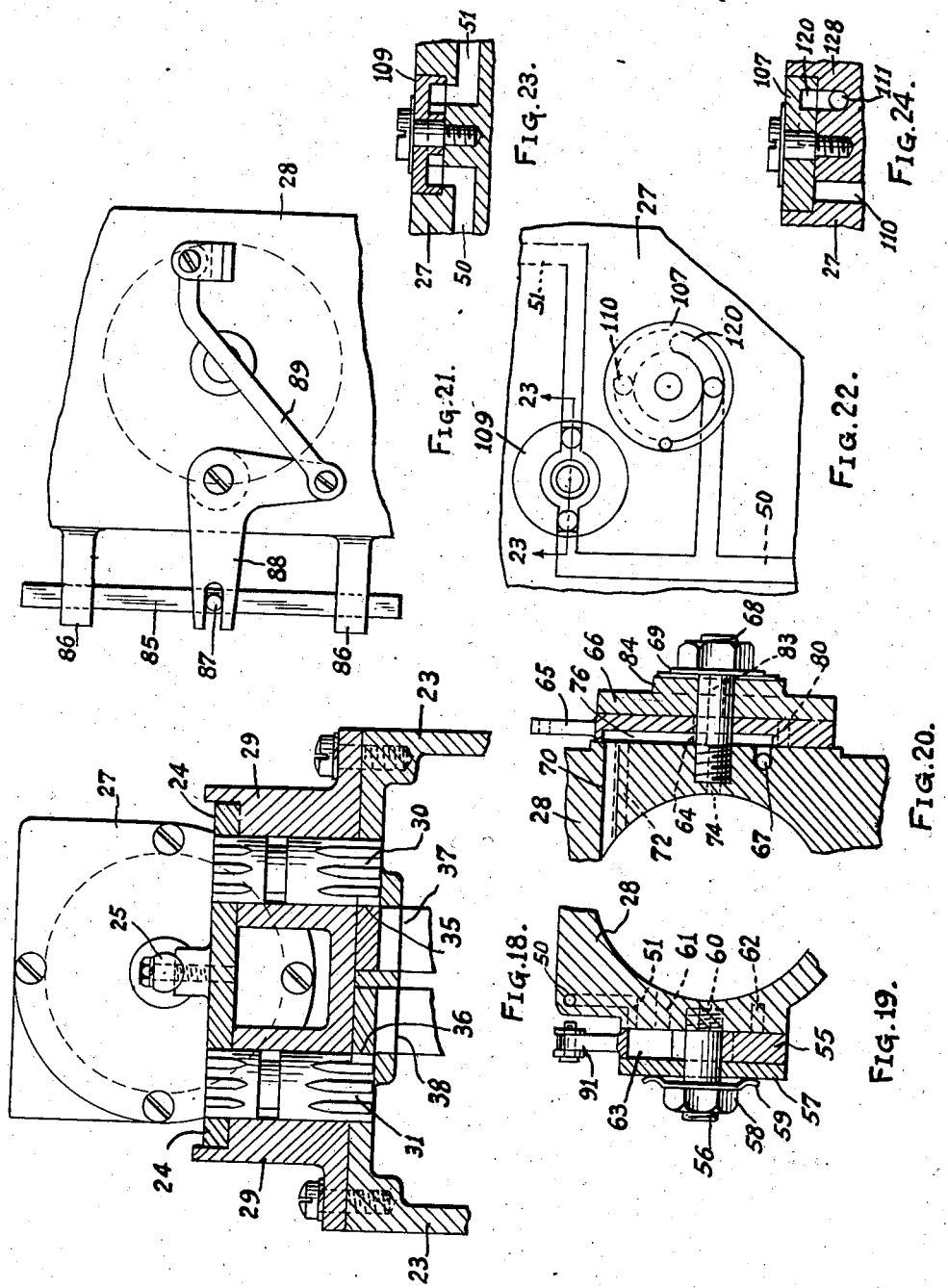

Patented Oct. 22, 1940

2,219,265

UNITED STATES PATENT OFFICE 2,219,265

DIRECTION AND SPEED RATIO CHANGING DEVICE FOR MOTOR VEHICLES

Joseph P. Castellano, New York, N. Y.

Application November 18, 1936, Serial No. 111,437

4 Claims. (Cl. 74—336.5)

This invention relates to drive ratio and direction of drive changing mechanisms and in particular to mechanism for changing the drive ratio and direction of drive for motor vehicles.

Mechanisms have been proposed for automatically or semi-automatically, shifting the drive ratio gears of the transmission of motor vehicles; such proposed mechanisms while they are generally capable of producing the desired result have not gone into commercial use. This is due to their generally complicated structure, their high cost and the fact that they always include a large number of parts that are a continuous source of trouble either because of their rapid wear or because they require constant adjustment or both.

It is the object of this invention to provide automatically operatable mechanism for shifting the drive ratio gears of the transmission of a motor vehicle, which is of simple and rugged construction and which includes a minimum number of parts that are subject to wear or require adjustment.

It is also an object of this invention to provide automatically operatable mechanism for shifting the drive gears of the transmission of a motor vehicle which can be normally controlled and which enables the operator to obtain any desired performance.

It is a further object of this invention to provide automatically operable mechanism for shifting the drive ratio gears of the transmission of a motor vehicle which includes a single reciprocable piston arranged to reciprocate a motion translating device operatively connected to the gear shift rods of the transmission of the motor vehicle, said piston being automatically positionable during the forward movement of the vehicle in accordance with the speed of the vehicle to effect the movement of said translating device, while at all other times it is controlled by the operator; furthermore, said piston being manually controllable at all times to fixedly position it in the position that corresponds with an intermediate ratio of drive.

It is also an object of this invention to provide a motion translating device operatively connected to the gears of the shift rods of the transmission of the motor vehicle which is arranged to translate the normal movements of the usual shift lever into straight line reciprocating movement.

It is still a further object of this invention to provide automatically operatable mechanism for shifting the drive ratio gears of the transmission of a motor vehicle which can be manually controlled to shift the gears of the transmission into second speed from any other speed.

The further object and advantages of the invention will be better appreciated from a consideration of the following description of a preferred embodiment thereof taken with the accompanying drawings, in which, Fig. 1 is a schematic diagram plan view of a motor vehicle embodying my invention.

Fig. 2 is a front view partly in section of the device of Fig. 1.

Fig. 3 is a plan view of the shifting device of my invention.

Fig. 4 is a fragmentary front view of the governor valve seat.

Figs. 5, 6 and 7 are fragmentary front views showing the governor valve disc in various positions.

Fig. 8 is a fragmentary front view of the selector valve seat.

Fig. 9 is a front view of the selector valve disc.

Fig. 10 is a front view of the selector valve atmospheric gland.

Figs. 11, 12, 13, 14 and 15 are fragmentary front views showing the component parts of the selector valve in various positions.

Fig. 16 is a front view of the selector valve control and its various positions.

Fig. 17 is a schematic view of a gas throttle lock.

Fig. 18 is a fragmentary sectional view taken on the line 18—18 of Fig. 2.

Fig. 19 is a fragmentary sectional view taken on the line 19—19 of Fig. 3.

Fig. 20 is a fragmentary sectional view taken on the line 20—20 of Fig. 2.

Fig. 21 is a fragmentary end view looking from the right of Fig. 2.

Fig. 22 is a diagrammatic view showing the arrangement of two of the valves.

Fig. 23 is a detailed sectional view through one of the valves; and

Fig. 24 is a detailed sectional view through another of the valves.

As shown schematically in Fig. 1 motor vehicle 20 includes a motor 21 having an intake manifold 22 and a transmission case 23 upon which is mounted for reciprocatory movement motion translating plate 24. Plate 24 has fastened thereto one end of shaft 25, the other end of shaft 25 being fastened to a piston 26 which moves in a bore in cylinder casing 27 which is also fastened to the top of the transmission case 23.

Referring to Figs. 2 and 3, transmission casing 23 and the drive ratio gear arrangements shown therein are of the usual construction and arrangement. Casing 23 includes cover plate 28. Plate 28 carries integral therewith cylinder casing 27 and guide plate 29. Motion translating plate 24 is mounted for reciprocatory movement in guide plate 29 as shown in Figure 24, guide plate 29 supporting and preventing lateral motion of the plate 24. Guide plate 29 has two holes therethrough into one of which is journalled pinion 30 and into the other of which is journalled pinion 31. Set screws 32 (one only being shown) are used to fix pinion 30 and 31 against all axial movement. The upper end of pinion 30 and 31 extends respectively into elongated slot 33 and 34. The lower end of pinion 30 meshes with rack 35 while the lower end of pinion 31 meshes with rack 36.

Rack 35 has joined thereto gear shift fork 37 and rack 36 has joined thereto gear shift fork 38. Gear shift fork 37 moves gear 39 and its half of dog clutch 40 back and forth on shaft 41 and gear shift fork 38 moves gear 42 back and forth on shaft 41. It is of course understood that gears 39 and 42, as well as said one half of dog clutch 40, are splined on shaft 41.

At one side of slot 34 is fixed a rack 43 and on the other side is a rack 44, both racks being positioned substantially as shown. At one side of slot 33 is fixed a rack 45 and on the other side is a rack 46 both of these racks being also positioned as shown.

Plate 24 when moved back and forth under the influence of shaft 25 effects the engagement and disengagement of the gears of the transmission through the agency of pinions 30 and 31.

Referring now particularly to Fig. 2 and Fig. 3: In these figures the parts are shown as they appear when the drive ratio gears are in the neutral position. To go from "neutral" to "reverse" position, shaft 25 moves toward the rear of the transmission, carrying plate 24 with it. This will move rack 43 past pinion 31 rotating it counter-clockwise. The rotation of pinion 31 will move rack 36 and gear shift fork 38 towards the rear of the transmission to cause gear 42 to mesh with reverse gear 47. To go from "reverse" position back to neutral position the reverse of that just described will take place.

To go from "neutral" position to "first" speed position shaft 25 and plate 24 are moved toward the front end of the transmission until rack 43 is out of mesh with pinion 31.

This movement of plate 24 will, through rack 43, rotate pinion 31 in a clockwise direction. This rotation of pinion 31 will move rack 36 and gear shift fork 38 towards the front end of the transmission to carry gear 42 into mesh with first speed ratio gear 48. To go from "first" speed position back to "neutral" position the reverse of that just described will take place.

To go from "first" speed position to "second" position the movement towards the front end of the transmission, shaft 25 and plate 24, is continued until rack 44 has passed pinion 31. This will first result in pinion 31 meshing with rack 44 and receiving a counter clockwise rotation which is sufficient to cause it to move rack 36 and gear shift fork 38 as required to carry gear 42 out of engagement with gear 48 and back to "neutral" position. After this, rack 45 will mesh with pinion 30 to rotate it clockwise. The clockwise rotation of pinion 30 will cause it to move rack 35 and gear shift fork 37 towards the rear of the transmission and will carry gear 39 into mesh with "second" speed gear 49. To go from "second" speed position back to "first" position, the reverse of that just described will take place.

To go from "second" speed position to "high" speed position shaft 25 and plate 24 are again moved towards the front end of the transmission until rack 46 is past pinion 30, this movement of plate 24 will cause rack 46 to rotate pinion 30 in a counter clockwise direction to carry gear 39 out of mesh with gear 49 and the halves of dog clutch 40 into engagement. To go from "third" speed position back to "second" speed position the reverse of that just described will take place.

The mechanism for effecting the desired movements of shaft 25 and plate 24 will now be described. Cylinder casing 27 is bored to accommodate the movement therein of piston 26. In the walls of cylinder casing 27 is a suction passageway 50 that terminates in a port 51 in one side of cylinder casing 27. Passageway 50 has a clutch controlled valve 52 therein that is operatively connected to the clutch of the vehicle, which may be manual or automatic, thru a linkage 53, valve 52 and linkage 53 are so arranged that when the clutch is declutched valve 52 is open and when the clutch is clutched valve 52 is closed. Passageway 50 is connected by any suitable means, as by conduit 54 to intake manifold 22 of the engine 21. If preferred passageway 50 may be in connection with any desired suction producing means.

The side of cylinder casing 27 into which passageway 50 opens at port 51 is machined to form a valve seat for governor controlled disc valve 55, shown in detail in Fig. 19. A stud 56 projects from the center of the valve seat and carries for rotation thereon disc 55 and valve cover plate 57, a nut 58 is screwed on the end of stud 56 and a spring 59 is interposed between cover plate 57 and nut 58 to maintain the desired pressure on cover plate 57 and valve disc 55.

Passageway 60 and 61 communicate the cylinder bore directly with the valve seat and open in the valve seat as shown in Fig. 4. Passageway 62 also opens in the valve seat as shown in Fig. 4. The end of passageway 60, 62 and port 51 are equidistant from the center of rotation of valve disc 55.

Valve disc 55 has an arcuate groove 63 cut into the face thereof that contacts with the machined seat in cylinder casing 27.

This arcuate groove as shown in Figs. 5, 6 and 7 is part of a ring that would include the ends of passageways 60 and 62 and port 51 and is such a length as to extend from port 51 to the end of passage 60 as shown in Fig. 7. Groove 63 has an inwardly directed radial extension adapted to extend to passageway 61 when valve disc 55 is positioned as shown in Fig. 6.

Passageway 62 extends from the side of cylinder casing 27 in which the valve just described is found to the opposite side of cylinder casing 27 and opens in port 67 in the seat 64 of the primary selector valve. The primary selector valve includes a valve disc 65 and an atmospheric gland 66 shown in Figs. 8, 9, 10 and 20. Valve disc 65 and gland 66 are mounted for rotation on a stud 68 that projects form cylinder casing 27 at the center of the valve seat 64, gland 66 and disc 65 are held firmly against each other and against valve seat 64 by the force exerted by spring 69 that cooperates with the nut on the end of stud 68.

Passageway 70, 71, 72, 73 and 74 open in valve seat 64. Passageway 70 opens in seat 64 as an arcuate shallow groove to provide a neutral range for purposes apparent hereinafter. Passageway 70 communicates valve seat 64 directly with cylinder bore and determines the neutral speed position of piston 26. Passageway 71 communicates directly with the cylinder bore and determines the first speed position. Passageway 72 communicates valve seat 64 with the cylinder bore and determines the reverse speed position of piston 26.

Passageways 73 and 74 communicate valve seat 64 with the ends of cylinder bore and form part of the atmospheric vents whose purposes will be apparent hereinafter.

Primary selector valve disc 65 has a shallow circular groove 75 cut therein on the one of its faces that contacts with valve seat 64. Groove 75 is so positioned that it will cover port 67 in all positions of primary selector disc 65. Groove 75 includes a radial extension 76 of sufficient length to register when properly positioned with passageways 70, 71 and 72. Disc 65 also includes bores 77, 78, 79 and 80 therethru which are adapted to register with the ends of passageways 73 and 74 as hereinafter explained. Bore 79 has a short arcuate groove 81 extending therefrom on the face that contacts with valve 64.

Atmospheric gland 66 has bores 82 and 83 therethru which are respectively adapted to register when properly positioned with bores 77 and 79 and passageway 73 and bores 78 and 80 and passageway 74. Atmospheric gland 66 has a finger 84 attached thereto which is adapted to cooperate with a saw tooth rack 85 for oscillating gland 66. Rack 85 is supported for sliding movement in brackets 86 and is integral with the cylinder block 27.

Rack 85 has an extension 87 that fits into the elongated slot in the end of bell crank 88. Bell crank 88 is pivoted to cylinder block 27 and is actuated by lever 89 that in turn is actuated by bell crank 90. Bell crank 90 is pivoted to cylinder block 27 and is actuated by arm 91 that is in turn actuated by bell crank 92. Bell crank 92 is actuated by governor 93 that is connected to the speedometer shaft or other shaft that rotates in accordance with the speed of the vehicle. Arm 91 has an end pivoted to valve disc 55 and moves in accordnace with the movement of the governor 93 to position disc 55 as will also be explained hereinafter.

Valve disc 65 has fastened thereto one end of a push-pull wire 94 (Fig. 2) that is operated by handle 95 provided with an index which is adapted to register with position indicating letters on dial 96. Dial 96 is preferably positioned on the instrument board of the vehicle within easy reach of the operator.

Positioned on the vehicle and within sight of the operator is a speed gear ratio indicator or tell tale 97. Tell tale 97 includes a plurality of lettered or numbered windows in back of each of which is a light bulb not shown which when lit will visibly indicate the speed gear ratio in use.

Adjacent the path of the motion translating plate 24 is positioned a contact plate 98 upon which is mounted a plurality of contacts 99 which are so positioned relative to plate 24 that contact 100 will contact with one of them at each speed gear ratio position of plate 24. Contact 100 is grounded, as to the frame of vehicle, and contacts 99 are connected to their respective bulbs by insulated wires 101. The other side of the bulbs are connected to the positive side of the storage battery of the vehicle by insulated wires 102.

On the floor board of the vehicle adjacent the usual position of the left foot of the operator is mounted a rocker 103 to which is fastened one end of Bowden wire 104. The other end of wire 104 is fastened to one end of bell crank 105 that is pivoted to the cylinder casing 27. Bell crank 105 has pivoted thereon one end of a short link 106 that actuates emergency second speed valve 107, a short link 108 is also pivoted to valve 107 and actuates shut off valve 109.

Valve 107 is of the disc type and is carried for rotation on a stud that extends from cylinder casing 27.

A nut and spring washer are provided for assuring proper contact between valve 107 and its seat. Valve 107 includes semi-circular groove 15 in its inner face which when properly positioned affords communication between passageway 110 and 111. Passageway 111 branches into passageway 50 whereas passageway 110 opens directly into cylinder bore.

Shut off valve 109 is arranged to shut off communication between passageway 50 and port 51 when valve 107 connects passageways 110 and 111.

Bell crank 105 has an elongated slot in its end into which is positioned a pin carried by link 112. To the ends of link 112 are pivoted arms 113 one of which actuates emergency vent valve 114 and the other of which actuates emergency vent valve 115. Vent valve 115 is of the plug type and is adapted to obstruct passageway 73. Valve 115 is provided with a circular groove 116 that extends 270 degrees therearound and affords communication between the branches of passageway 73 during the ordinary operation of the device. A bore 117 passes thru the center of vent valve 115 and opens between the ends of groove 117 so that when the operator presses rocker 103 to change from the third speed to emergency second the forward end of cylinder bore will be vented thru the inner branch of passageway 73 and bore 117. When the change to emergency second is made from the lower speeds vent 115 will disconnect the two branches of passageway 73. Vent 114 is similar to vent 115 but is provided with a semicircular groove 118 and a bore 119. Bore 119 is arranged to vent the rear end of the cylinder bore thru passageway 74 when the operator presses rocker 103 to change to emergency second from the lower speeds.

When the change to emergency second is made from high speed, vent valve 115 will block passageway 73. Vent valves 114 and 115 and their grooves and bores are so arranged that during emergency second speed operation when one of them vents its end of the cylinder bore the other closes its end to the atmosphere.

*Operation*

In describing the operation of the device the terms "clutch" and "declutch" will be used respectively to denote the engagement of the motor with the drive shaft thru the clutch and their disengagement of the motor with the drive shaft. As both manual and automatic clutches are well known it is not deemed necessary to describe their operation each time they are used.

Assuming that the vehicle is at a stand still and the motor is not running, the parts just described will be in the neutral position as shown in Figs. 2 and 3. As the motor is started an automatic clutch is used, the automatic clutch operating mechanism will function to declutch the clutch thereby actuating linkage 53 to open valve 52 and to place passageway 50 in communication with the intake manifold 22. If a manual clutch is used, valve 52 is opened by stepping on the clutch pedal. To go into the first forward speed the operator will manipulate handle 95 to register index 95 with "forward" on dial 96, this will cause linkage 94 to rotate primary selector valve disc 65 from the position shown in Fig. 15 to the position shown in Fig. 11, thus interrupting communication between port 67 and passageway 70, and establishing communication between port 67 and passageway 71 thru groove 75 and its extension 76. This also causes passageway 74, 80 and 83 to be brought in alignment and arcuate groove 81 to cover passageway 73. With the various parts of the device thus positioned the suction of intake manifold 22 will be communicated thru passageway 50, arcuate groove 63, passageway 62, port 67, groove 75, extension 76, passageway 71, to the interior of the cylinder bore, thus causing piston 26 to move towards the front end of the transmission until it closes the end of passageway 71. This movement of piston 26 will have placed as hereinabove explained the speed ratio gears of the transmission into first speed position.

This will be indicated on tell tale 97 by the lighting of the first speed bulb. To start vehicle in its forward movement the clutch is clutched. This will cause linkage 53 to close clutch valve 52. As the vehicle moves forward governor 93 will rotate to cause movement of the linkage connected thereto. Movement of arm 91 will rotate governor valve disc 55 and cause arcuate groove 63 to interrupt communication between passages 62 and 50. Movement of arm 91 will also move bell crank 90, lever 89, bell crank and saw tooth rack. Since finger 84 is in its bottom position rack 85 will slip by it without causing movement thereof.

When the vehicle has attained the speed of from 6 to 10 miles per hour, arm 91 will have moved disc 55 to such an extent that arcuate groove 63 will cover passageway 61. Since this is the usual speed at which a change in gear ratio is made the clutch is declutched. This will cause linkage 53 to again open valve 52 thus again putting the cylinder bore in communication with the intake manifold 22 to cause further movement of piston 26 towards the front end of the transmission. The movement will cease when piston 26 covers passageway 61. The movement of piston 26 will cause plate 24 to shift the speed ratio gears to the second speed ratio as hereinbefore explained. When the change is completed tell tale 97 will indicate it by lighting the second speed bulb.

The clutch is again clutched. This as before will cause valve 52 to close.

When the vehicle has attained a speed of from 15 to 25 miles per hour arm 91 will have moved disc 55 to such an extent that arcuate groove 63 will cover passageway 60 and will have uncovered passageway 61. Since this is the usual speed at which a further change in gear ratio is made the clutch is again declutched as before, this will cause valve 52 to open, thus again putting the cylinder bore in communication with the intake manifold 22 and again causing the piston 26 to move towards the front end of the transmission. The movement of the piston at this time will continue until it shuts off passageway 60. This movement of piston 26 will in this manner heretofore explained cause plate 24 to shift the speed ratio gears to the high speed gear position. As before tell tale 97 will indicate the new gear ratio by lighting up the high speed bulb. After the change is indicated the clutch is clutched.

Governor 93 is so arranged that it will be fully expanded when the vehicle has attained the speed of from 15 to 25 miles per hour above mentioned so that further increase of speed vehicle will not cause further movement of disc 55.

When during the travel of the vehicle the speed is diminished, governor 93 will have no effect on disc 95 unless the speed is reduced from 25 or 15 miles per hour or less. As the speed is decreased below 25 to 15 miles per hour, governor 93 will begin to contract and begin to carry disc 55 towards the second speed position as above described. At the same time saw tooth rack 85 will move upward from the top of the transmission and will rotate finger 84 which will in turn rotate atmospheric gland 66 to align passageway 82 with passageway 79, groove 81 and passageway 73 and will carry passageway 83 out of alignment with passageways 74 and 80. Thus venting the forward side of the cylinder bore and closing the aft side of the cylinder bore to the atmosphere.

When the speed of a vehicle is reduced to from 15 to 6 miles per hour governor 93 will have carried disc 55 to the second speed position; if within the speed range mentioned and the clutch is declutched valve 52 will open communication between the cylinder bore and intake manifold 22 and piston 26 will be drawn toward the rear of the transmission until it closes the second speed passageway 61. This movement of piston 26 will cause plate 24 to shift the transmission gears from third to second speed ratio in the manner heretofore described. Tell tale 93 will indicate the change by lighting up the second speed bulb, after the change is indicated the clutch will be clutched.

If after this change the speed is again increased, governor 93 will again move disc 55 toward the high speed position and will cause movement of saw tooth rack 85 to rotate finger 84 and atmospheric gland 66 to close the forward side of the cylinder bore to the atmosphere and vent the after side.

If after the change to second speed above mentioned, however, the speed is further reduced, governor 93 will move to carry the extension of radial groove 63 out of registry with passageway 61 and the arcuate groove 63 toward registry with passageway 62.

When the vehicle is finally at a standstill groove 63 will register with passageway 62. At this time since the clutch will be declutched valve 52 will communicate the intake manifold 22 with the cylinder bore and piston 26 will be moved towards the top of the paper until it covers first speed passageway 71. This movement of piston 26 will cause plate 24 to shift the gears of the transmission from second speed to first speed ratio.

If it is desired to go to the neutral position handle 95 is moved so that the pointer will be on the neutral index instead of forward index as before. This will cause a rotation of primary selector valve disc 65 and will carry groove 76 out of registry with passageway 71 and into registry with passage 70. This also brings passageway 79 into direct registry with passageways 73 and 82. Since valve 52 is still open the suction in the cylinder bore will again move piston 26 toward the rear of the transmission until it closes passageway 70. This movement of piston 26 will through plate 24 cause the speed ratio gears to be changed from first to neutral position.

If it is desired to go into reverse, handle 95 is moved to bring its pointer into registry with the reverse index on dial 96, this will cause valve 65 to rotate and to carry groove 76 out of registry with passageway 70 and into registry with passageway 72. This will also carry passageway 77 into registry with passageway 82 and 73 to vent the forward side of cylinder bore. Since the clutch is declutched this operation will cause further movement of piston 26 towards the rear of the transmission until it closes passageway 72. To start the backward movement the clutch is clutched. To return to neutral the operation just described is reversed.

However it will be noticed that during this time the after side of cylinder bore is vented as the valve disc 65 will be shown in the position as indicated in Fig. 12 and passageway 78 registers with passageways 74 and 85.

If the vehicle is in high speed gear and for some reason as for instance in climbing or descending a hill, it is desired to go into second speed gear, rocker 103 is rocked to one side to pull Bowden wire 104 towards the right hand side of the transmission. This will cause bell crank 105 to rotate, and, links 106 and 108 to operate valves 107 and 109, thus shutting off passageway 50 and communicating passageway 111 with 110 by means of groove 120. This movement of bell crank 105 will also cause link 112 to move towards the rear of the transmission and rotate valve 114 and 115 to vent the forward side of cylinder bore thru valve 114 and to shut off the aft side from the atmosphere thru valve 115. After this operation the clutch is declutched to open valve 52. Piston 26 will then move towards the rear of the transmission until it shuts off passageway 110. This movement of piston 26 will cause plate 24 to shift the speed ratio gears from the third speed position to second speed position, to continue the forward motion the clutch is clutched as before.

If it is desired to go into second speed from any other gear ratio the Bowden wire will be pushed towards the left hand side of the transmission. The movement of the various parts should be obvious from the above.

In order to prevent feeding of gas to engine 21 during the shifting of the speed ratio gears the gas lock arrangement shown in Fig. 17 is provided. This lock comprises a bell crank 122 one end of which is forked and surrounds gas pedal rod 121 and is maintained thereon by suitable stops 125.

The other end of bell crank 122 is also forked and surrounds one end of bell crank 123. The other end of bell crank 123 is bent, as shown, to enter notches in block 124 which is carried by plate 24. The notches in plate 124 are so spaced that gas pedal 121 can only be depressed when gear changes have been completed.

What I do claim as my invention and desire to secure by Letters Patent, is:

1. In an automotive vehicle, the combination of a driving member, a driven member, a selective gear transmission between said members, and means for shifting the gears of said transmission, said means including a shifting element movable in different directions for different gear positions, a power device, a rotatable member engaging the element to slide it, means controlled by the speed of the driven member for controlling the movement of the power device, and a member moved by the power device and first engaging one and then the other side of said rotatable member to cause reversal of the movement of it and of the element.

2. In an automotive vehicle, the combination of a driving member, a driven member, a selective gear transmission between said members, and means for shifting the gears of said transmission, said means including a plurality of shifting elements movable in different directions for different gear positions, a power device, a plurality of rotatable members engaging the elements to slide them, and a plurality of members moved by the power device and first engaging one and then the other side of said rotatable members to cause reversal of the movement of them and of the elements.

3. In a gear shifting device, a vacuum operated motor, a pair of gear shifting rails, a pinion for driving each rail, racks driven by the motor selectively engaging one side and then the other of one pinion and then the other pinion, and means for selectively moving the motor to any of its positions.

4. In an automotive vehicle, the combination of a driving member, a driven member, a variable speed gear transmission between said members, and means for shifting the gears of said transmission, said means including a plurality of shifting elements movable in different directions for different gear positions, a plurality of gears each meshing with one of the shifting elements and a reciprocable mutilated rack having teeth on opposite sides of each of the gears for selectively moving the gears first in one direction and then in the other to effect the desired change in gear ratio.

JOSEPH P. CASTELLANO.